United States Patent [19]

Straubinger

[11] 4,239,175
[45] Dec. 16, 1980

[54] MOLD FOR FORMING FROZEN FOOD PRODUCT AND CAP MEMBER THEREFOR

[76] Inventor: Paul Straubinger, 21-33 28th St., Astoria, N.Y. 11105

[21] Appl. No.: 95,404

[22] Filed: Nov. 19, 1979

[51] Int. Cl.³ ............................................. A23G 9/26
[52] U.S. Cl. ..................................... 249/92; 249/121
[58] Field of Search ............................ 249/83, 92, 121

[56] References Cited

U.S. PATENT DOCUMENTS

| 478,861 | 7/1892 | Howard. | |
|---|---|---|---|
| 1,151,869 | 8/1915 | Freeburg. | |
| 1,628,434 | 5/1927 | Schnaier | 249/92 |
| 1,743,375 | 1/1930 | Mundorff | 249/92 |
| 1,987,945 | 1/1935 | Schnaier | 249/92 |
| 2,003,612 | 6/1935 | Schnaier | 249/92 |
| 2,052,496 | 8/1936 | Stassi. | |
| 2,355,010 | 8/1944 | Pera. | |
| 2,599,919 | 6/1952 | Hucknall. | |
| 2,946,207 | 7/1960 | Hulterstrum | 249/121 X |
| 3,411,463 | 11/1968 | Moseres | 249/92 |

*Primary Examiner*—J. Howard Flint, Jr.
*Attorney, Agent, or Firm*—Gerard F. Dunne

[57] ABSTRACT

A mold for preparing frozen food products from a flavored liquid includes cap members adapted to fit over respective cup members retaining the liquid. The cap members have anchoring portions for extending centrally within the cup members whereby the liquid may be made to freeze thereabout. The cap members further include domed shaped central portions to serve as drip trays and a straw member leading from the interior of the central portion to enable liquid caught therein to be drawn off.

9 Claims, 4 Drawing Figures

MOLD FOR FORMING FROZEN FOOD PRODUCT AND CAP MEMBER THEREFOR

The present invention relates to molds for forming frozen food products from liquids.

Such molds are known and, as illustrated by U.S. Pat. No. 2,946,207, typically include one or more cup members for receiving liquid and a respective cap member fitting over the mouth of each cup member. The cap members typically include an integral handle portion and an anchoring portion extending interiorly of the cap member. The cap members are often shaped so that they form a drip tray beneath the frozen product after the product has been withdrawn from the mold.

It is a general object of the present invention to improve such molds by providing means whereby the liquid collecting in the drip tray during consumption of the frozen product may be withdrawn easily.

Molds according to the present invention for preparing a frozen food product from a liquid include at least one cup member adapted to retain the liquid and a respective cap member adapted to fit over each cup member. Each cap member has a generally domed shaped central portion and includes a handle portion extending from the outer surface of this central portion and an anchoring portion adapted to extend centrally within the respective cup member. In this way, liquid retained in the cup member may be made to freeze about the anchoring portion and the cap member may then be removed and inverted to form a drip tray adapted to catch drippings from the frozen product. Additionally, each cap member includes a straw member communicating interiorly of the central portion and extending outwardly therefrom to enable liquid caught in the central portion to be drawn off by the user.

The central portion of each cap member is preferably sized to cover the mouth of the respective cup member and further includes a rim portion depending from the central portion and adapted to fit over the outer surface of the respective cup member. Also, the central portion preferably has a centering flange running centrally around the inner surface thereof. This centering flange is adapted to fit within the mouth of the respective cup member and each centering flange is formed by wall portions spaced end to end to ensure flow communication between the adjacent wall portions. In order to ensure that the person consuming the frozen food product can orally reach the entire product, the anchoring portions each include a shaft extending beyond the rim portion of the respective cap member and have undulations formed on those portions of the shaft extending beyond the rim portion. In this way, the person consuming the frozen food product can cause lower portions of the product to slide upwardly along the shaft to a level above the rim portion as desired. Further, each rim portion may have an inwardly extending lip to prevent spillage, and each cup member may have a portion of its side wall indented to increase the surface area of the resultant frozen food product.

Other features, advantages and objects of the present invention will become apparant from the following description of a preferred embodiment thereof taken in conjunction with the following drawings in which.

Figure 1:
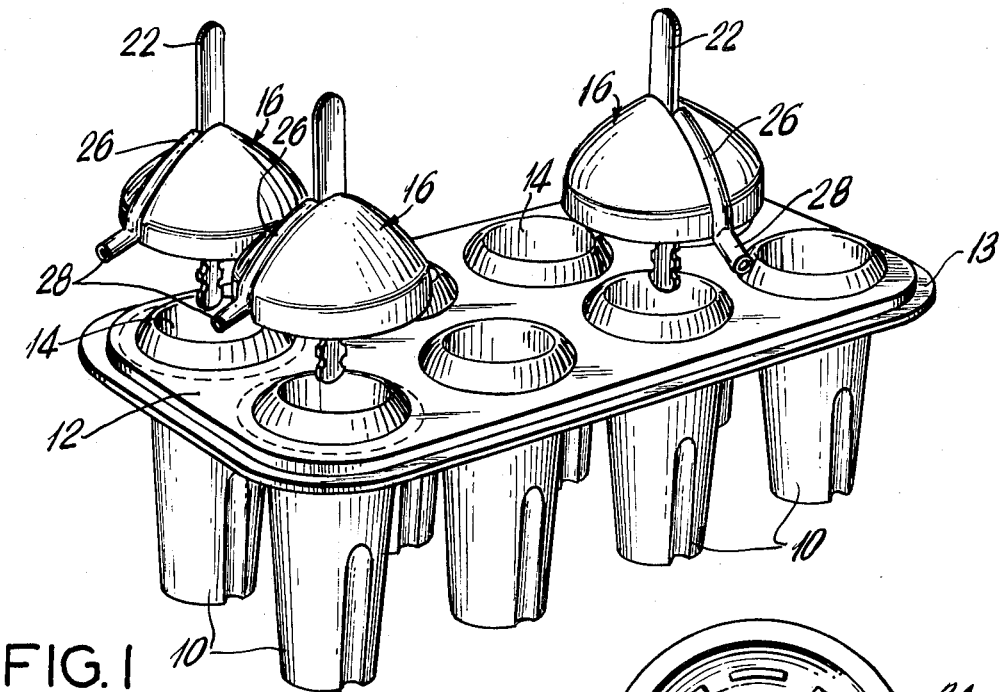
FIG. 1 is a perspective view of a mold according to the present invention.
Figure 3:
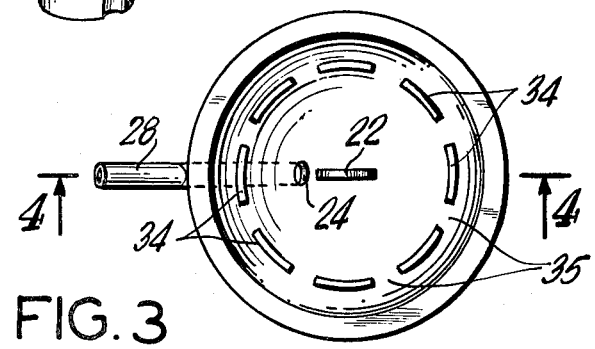
FIG. 3 is a top elevation of the cap member of the mold of FIG. 1.

The mold of the present invention may take many forms and, as illustrated in FIG. 1, preferably includes a plurality of cup members 10 held to one another by the flange portion 12 having a stepped outer edge. The respective cup members 10 and interconnecting flange portion 12 are preferably formed integrally from a synthetic plastics material. Each cup member has an upper mouth 14 through which liquid, such as a flavored fruit drink, may be poured into the cup member. Fitting over the mouth of each cup member, is a respective cap member 16 each preferably formed from a synthetic plastic material.

Figure 2:
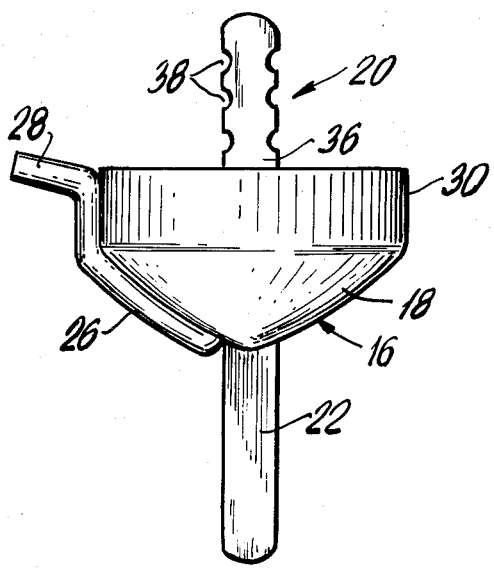
FIG. 2 is a side elevation of the cap member of the mold of FIG. 1.

Each of the cap members has a central portion 18 which is generally domed shaped. An anchoring portion 20 extends, as shown in FIG. 2, upwardly from the interior of the central portion 18 and, as can be seen in FIG. 1, is adapted to extend centrally within the respective cup member. The cap members also each include a handle portion 22 extending from the outer surface of the respective central portion.

As would be well understood by one skilled in the art, the cup members may be filled with flavored liquid, and the cap members thereafter fitted over the respective cup members with their anchoring portions extending centrally within the repsective cup members. The mold may then be placed in the freezer compartment of a refrigerator, whereupon the flavored liquid will freeze around the respective anchoring portions. Thereafter, the mold can be removed from the freezer compartment and the cap members can be lifted upwardly to remove the frozen product from the respective cup members. The frozen product may then be consumed by inverting the cap members whereupon the domed shaped central portions would serve as drip trays to catch the drippings melting from the frozen product during consumption.

Figure 4:
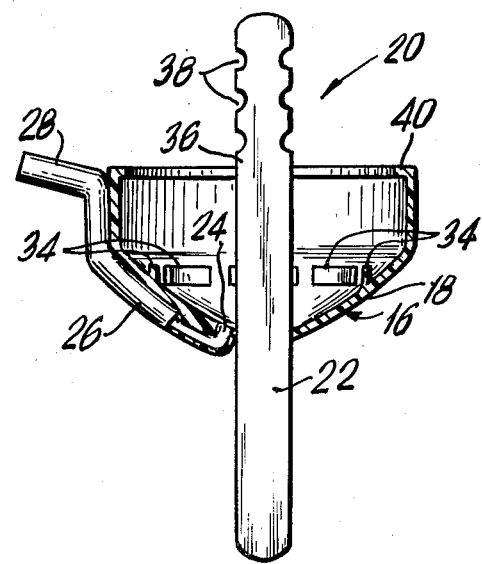
FIG. 4, is a side sectional view of the cap member taken along line 4—4 of FIG. 3.

Each cap member has an opening 24 formed in the lower region of its central portion 18, as can be seen most clearly from FIG. 4. Communicating with the interior of the central portions 18 through these opening 24 are respective straw members 26 each formed by a respective cylindrical tube preferably molded unitarily with the respective cap member. The straw members 26 extend upwardly along the outer surface of the respective cap member and terminate in respective end portions 28 extending upwardly in a lateral direction. The straw members are preferably ¼ inch in inside diameter and are so constructed and arranged that they permit liquid caught in the central portion of the cap member to be drawn off by the user consuming the frozen product. The cap members are each adapted to be fitted down over the respective cup member with the end portion 28 of its straw members facing outwardly and seated within the stepped outer edge 13 of the flange 12.

The central portions 18 of the cap members are each sized to cover the mouth 14 of the respective cup members and include rim portions 30 adapted to fit over the outer surface of the mouths of the respective cup member. The rim portions 30 are each about ½ inch in height and are adapted to seat upon the flange 12 which is spaced about ⅜ inch from the top of the mouths of the cup members. Within the central portion 18 of each cap member is a centering flange 32 running centrally around the inner surface thereof. The centering flange is adapted to fit relatively snugly within the mouth of the respective cap member so as to be concentric therewith and thus centers the cap member thereon. The centering flanges 32 are each comprised by wall portions 34 spaced from one another so as to assure liquid caught in the central portion may flow towards the opening 24. Preferably, there are 8 such wall portions having 8 spaces 35 therebetween and these wall portions may each be about ¼ inch high and have a length of about 7/16 of an inch.

The anchoring portions may, of course, take any of several forms but preferably each include a shaft 36 extending outwardly from the center of the respective central portions 18 and having undulations 38 formed on only those portions extending beyond the rim portion 30. In this way, the portions of the shaft 36 within the central portion 18 are relatively smooth. Consequently, when the frozen food product has been eaten down to the top of the rim portion 30, the remaining portion of the food product can be slid easily along the shaft 36 to ease access thereto.

Further, as shown most clearly in FIG. 4, a lip 40 extends inwardly from the upper edge or the rim portion 30 so as to aid in preventing spillage of any liquid accumulating in the cap member during consumption of the frozen food product. Also, as shown in FIG. 1, the side walls of the cap member 10 may be indented to increase the surface area of the resulting food product and thereby cause it to melt a little faster.

While the present invention has been described and illustrated with reference to the particulars of a preferred embodiment thereof, it will be apparant that the new features herein set forth may also be employed in other forms while still utilizing the substance of the present invention which is intended to be defined by the appended claims.

What is claimed is:

1. In a mold for preparing a frozen food product from a liquid, comprising at least one cup member each adapted to retain a liquid food product and having a respective cap member adapted to fit thereover, each said cap member having a generally domed shaped central portion and including a handle portion extending from the outer surface of said central portion and an anchoring portion adapted to extend centrally within the respective cup member, whereby liquid retained in each said cup member may be made to freeze about the respective anchoring portion and said cap member may then be removed and inverted to form a respective drip tray adapted to catch drippings from the frozen product, the improvement comprising a respective straw member communicating interiorly of each said central portion and extending outwardly from said central portion to enable liquid caught in said central portion to be drawn off by the user.

2. A mold according to claim 1, each said central portion being sized to cover the mouth of the respective cup portion and each said cap member further including a rim portion extending from said central portion and adapted to fit over the outer side surface of the respective cup member.

3. A mold according to claim 1 or 2, said central portion of each cap member having a centering flange running centrally around the inner surface thereof and adapted to fit within the mouth of a respective cup member, each said centering flange being formed by wall portions spaced end to end to allow flow communication therethrough.

4. A mold according to claim 2, each said anchoring portion including a shaft extending beyond the rim portion of the respective cap member and having undulations formed on those portions of said shaft extending beyond said rim portion.

5. A mold according to claim 2, each said rim portions each having an inwardly extending lip.

6. A mold according to claim 2, each said straw member extending along the outer surface of the respective central portion and rim portion, and then laterally outward therefrom.

7. A mold according to claim 1, each said cup member having a portion of its side wall indented to increase the surface area of the resultant frozen product.

8. A mold according to claim 1, including a plurality of said cup members interconnected by a flange having a stepped outer edge, the end portions of said straw members being adapted to seat within said stepped outer edge.

9. A cap member for use in a mold having a cup member adapted to retain a liquid for preparing a frozen food product from said liquid, comprising a central portion having a generally domed shape for fitting over said cap member, said central portion having a handle portion extending from the outer surface thereof and an anchoring portion adapted to extend centrally within said cup member, said cap member further comprising a straw member communicating interiorly of said central portion and extending outwardly from said central portion.

* * * * *

UNITED STATES PATENT AND TRADEMARK OFFICE
CERTIFICATE OF CORRECTION

PATENT NO. : 4,239,175
DATED : December 16, 1980
INVENTOR(S) : Paul Straubinger

It is certified that error appears in the above-identified patent and that said Letters Patent are hereby corrected as shown below:

Claim 9, line 42, change "cap" to --cup--.

Signed and Sealed this

Fourteenth Day of April 1981

[SEAL]

Attest:

RENE D. TEGTMEYER

Attesting Officer    Acting Commissioner of Patents and Trademarks